United States Patent
Milko

(10) Patent No.: US 9,560,209 B1
(45) Date of Patent: Jan. 31, 2017

(54) TECHNIQUES FOR TROUBLESHOOTING IP BASED TELECOMMUNICATIONS NETWORKS

(71) Applicant: Bandwidth.com, Inc., Raleigh, NC (US)

(72) Inventor: James Milko, Durham, NC (US)

(73) Assignee: Bandwith.com, Inc., Raleigh, NC (US)

(*) Notice: Subject to any disclaimer, the term of this patent is extended or adjusted under 35 U.S.C. 154(b) by 0 days.

(21) Appl. No.: 15/185,362

(22) Filed: Jun. 17, 2016

(51) Int. Cl.
*H04J 1/16* (2006.01)
*H04L 12/66* (2006.01)
*G08B 26/00* (2006.01)
*H04M 7/00* (2006.01)
*H04L 29/06* (2006.01)
*H04L 29/12* (2006.01)

(52) U.S. Cl.
CPC .......... *H04M 7/006* (2013.01); *H04L 61/2007* (2013.01); *H04L 65/1006* (2013.01)

(58) Field of Classification Search
CPC ............. H04L 41/0622; H04L 41/0618; H04L 12/1813; H04W 64/00; H04M 3/567
See application file for complete search history.

(56) References Cited

U.S. PATENT DOCUMENTS

| | | | | |
|---|---|---|---|---|
| 5,796,634 A * | 8/1998 | Craport | ................... | G01C 21/00 340/988 |
| 6,526,284 B1 * | 2/2003 | Sharp | ................... | G08G 1/0969 340/995.1 |
| 6,757,740 B1 * | 6/2004 | Parekh | .............. | G06F 17/30241 707/E17.11 |
| 7,046,636 B1 * | 5/2006 | Shaffer | ............... | H04L 12/6418 370/252 |
| 7,720,050 B1 * | 5/2010 | Blank | ..................... | H04J 3/085 370/352 |
| 2002/0099854 A1 * | 7/2002 | Jorgensen | ................. | H04L 1/20 709/249 |
| 2002/0194319 A1 * | 12/2002 | Ritche | ................. | H04L 41/0631 709/223 |
| 2005/0259606 A1 * | 11/2005 | Shutter | ................. | G08G 1/092 370/317 |
| 2006/0253611 A1 * | 11/2006 | Hu | ...................... | H04L 29/1232 709/245 |
| 2007/0263073 A1 * | 11/2007 | Nimri | .................... | G06Q 10/10 348/14.08 |

(Continued)

*Primary Examiner* — Melanie Jagannathan
(74) *Attorney, Agent, or Firm* — Gregory Stephens

(57) ABSTRACT

Techniques are disclosed for troubleshooting an IP telecommunications network. A network server sends a notification message to a plurality of IP addresses each associated with a customer endpoint. The server receives a notification response from each of the customer endpoint IP addresses and determines a response time for each of the customer endpoint IP addresses. The response times are compared to an expected notification response time and those that exceeded an expected response time are geo-located. Traceroutes are performed to customer endpoint IP addresses in the same geo-located area that exceeded the expected response time. All hops between the server and the customer endpoint IP addresses for each traceroute performed are geo-coded to determine impacted and non-impacted routes between the server and each customer endpoint IP address. IP traffic between the server and a customer endpoint IP address may then be re-routed from an impacted route to a non-impacted route.

9 Claims, 6 Drawing Sheets

(56) References Cited

U.S. PATENT DOCUMENTS

| | | | | |
|---|---|---|---|---|
| 2008/0076447 | A1* | 3/2008 | Duxbury | H04W 64/00 455/456.1 |
| 2009/0278708 | A1* | 11/2009 | Kelley | G01D 4/002 340/870.39 |
| 2012/0200426 | A1* | 8/2012 | DiLuciano | H04L 41/065 340/870.07 |
| 2012/0257621 | A1* | 10/2012 | Ishii | H04L 41/0853 370/389 |
| 2013/0031033 | A1* | 1/2013 | Prieditis | H04L 61/609 706/12 |
| 2015/0026073 | A1* | 1/2015 | Storey | G06Q 10/0639 705/300 |
| 2015/0254969 | A1* | 9/2015 | Bishop | H04L 41/0622 340/506 |
| 2016/0132774 | A1* | 5/2016 | Prieditis | G06N 5/04 706/12 |

* cited by examiner

300

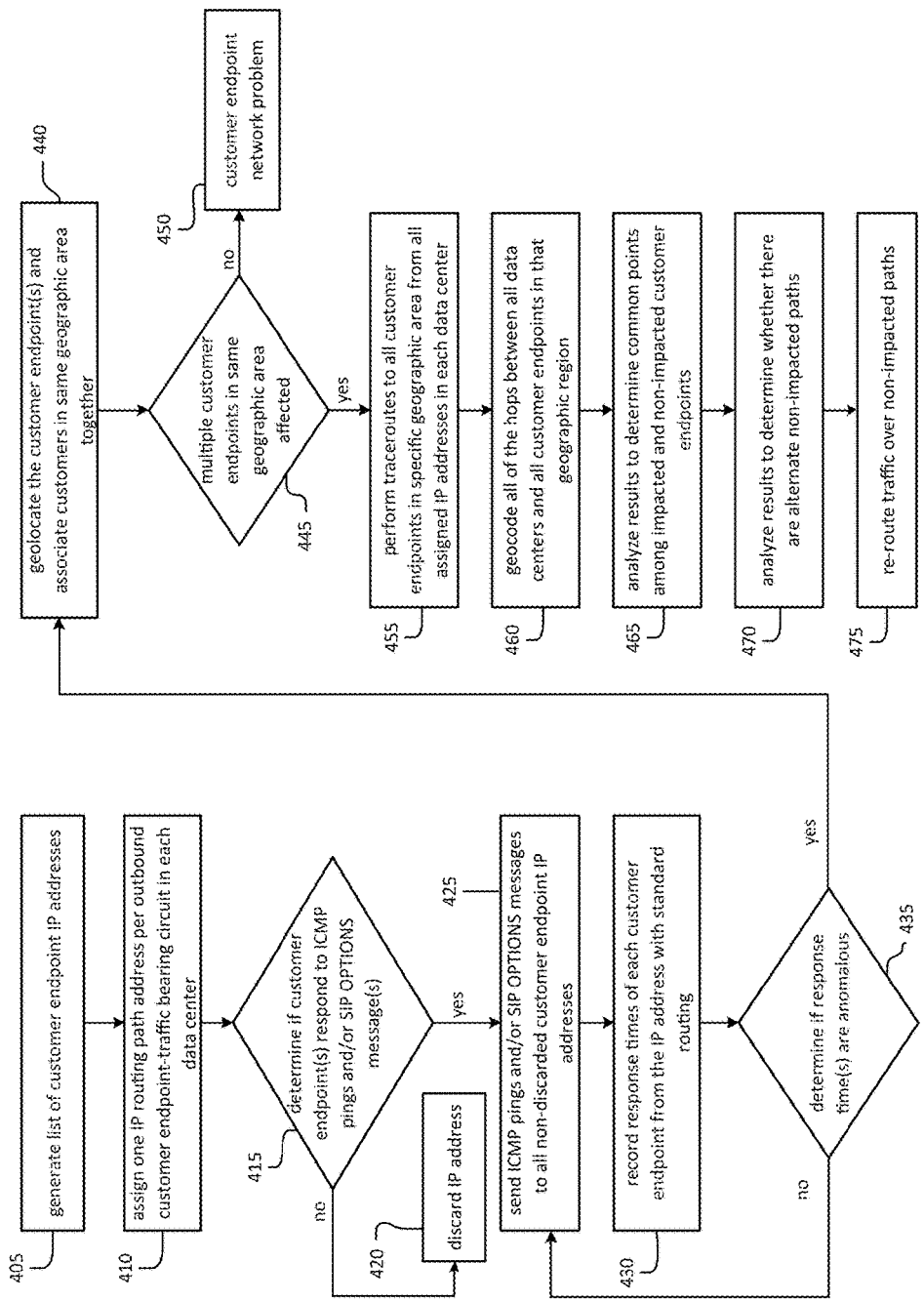

500

550

TECHNIQUES FOR TROUBLESHOOTING IP BASED TELECOMMUNICATIONS NETWORKS

TECHNICAL FIELD

Examples described herein are generally related to techniques for troubleshooting packet transmission issues for Voice over Internet Protocol (VoIP) telecommunications on IP networks.

BACKGROUND

VoIP telephony service providers are entities that provide VoIP telecommunications services to their customers. To achieve this goal the service providers manage large VoIP telephony networks that utilize the Internet as the fundamental infrastructure to exchange voice data between endpoints. While the Internet may be the conduit for carrying voice traffic, a series of routers, switches, telephony servers, databases, communication devices, and other components are needed to actually manage and move the voice traffic, in the form of IP data packets, through the vast network plumbing that is the Internet.

Traditional telephony used to be solely circuit-switched and was managed by a relatively small number of service providers known as incumbent local exchange carriers (ILECs) like AT&T and Verizon. Circuit switched telephony operated (and still operates) over what is commonly known as the public switched telephone network (PSTN). The PSTN is organized as a series of switches and gateways that connect one endpoint to another over a single predetermined dedicated path. That is, there is a dedicated voice path from endpoint to endpoint (e.g., phone to phone) that is not shared by any other communication session (e.g., phone call) for the duration of that call. In practice, a calling phone requests and receives a dedicated circuit connection to the called phone, and if the called phone answers that direct circuit path remains dedicated to those endpoints for the duration of the call.

VoIP telephony systems differ from the legacy circuit-switched telephony systems. VoIP telephony does not rely on a dedicated path or circuit between endpoints. Rather, the end user device digitizes analog audio and forms it into an IP packet stream. The IP packet stream is then addressed to a destination device and routed much the same as other Internet traffic—that is it may share a "connection" and mingle with other IP data as it gets routed to its destination. When it reaches its destination, a device on the other end can re-assemble the original IP packet stream and convert it to analog audio.

Moreover, there are inter-connection points in VoIP telephony networks that allow VoIP calls and circuit-switched calls to connect with one another such that a VoIP end user can make and receive calls with a circuit-switched end user despite the network differences. It should also be noted that traditional cellular telephony is a form of circuit-switched calling that uses a cellular standard wireless interface (typically GSM or CDMA) capable of connecting with the PSTN. More recently, there are cellular wireless interfaces that utilize IP based standards (e.g. LTE or VoLTE) to wirelessly place and receive what are, in effect, VoIP calls since the newer cellular wireless interfaces are IP based rather than circuit-switched. The end result is a vast telecommunications network that provides wireline and wireless inter-connectivity for both circuit-switched devices and VoIP devices.

VoIP traffic can traverse a variety of routers and gateways, in multiple IP networks, between its source and its destination. The VoIP telephony service providers are generally responsible for maintaining a working network to ensure that calls made and received by its customers are completed. When a customer experiences trouble making and receiving calls, the VoIP telephony service provider must quickly discover and correct the problem. Often, there is no way to determine a problem until it is experienced by the customer and reported to the service provider.

What is needed are techniques to monitor the VoIP telephony network and anticipate or discover problems before they significantly affect the customer.

BRIEF DESCRIPTION OF THE DRAWINGS

FIG. 4 illustrates an example logic flow diagram according to an embodiment of the invention.

DETAILED DESCRIPTION

The embodiments described herein disclose systems and methods for monitoring and testing IP network endpoint connections to intermediate IP network components (e.g., routers) and other IP network endpoints so as to determine if and when a particular IP network component or IP network endpoint may be malfunctioning. The embodiments described herein further disclose systems and methods for re-routing IP traffic, specifically communication session traffic around any malfunctioning IP network components. The systems and methods embodied herein may be performed by communication devices and network based computer telephony servers and other devices in combination with software instructions executed by some or all of such devices, as will be explained in detail below. The different types of networks contemplated herein include, for example, Internet Protocol (IP) based cellular data networks and IP based data networks, such as the Internet, wide area networks (WANs), local area networks (LANs), and combinations thereof including wireless (e.g., 802.11) and wireline (e.g., Ethernet).

As used herein the term "communication session" is meant to generally indicate a telephone call over an IP telecommunications network. The term "circuit-switched telephony network" is meant to generally indicate a telephony network that connects endpoints directly over a single dedicated path. The term "VoIP telephony network" is meant to generally indicate a telephony network in which digitized and packetized IP communication session data may be sent and received through a series of IP network components and connections.

Figure 1:
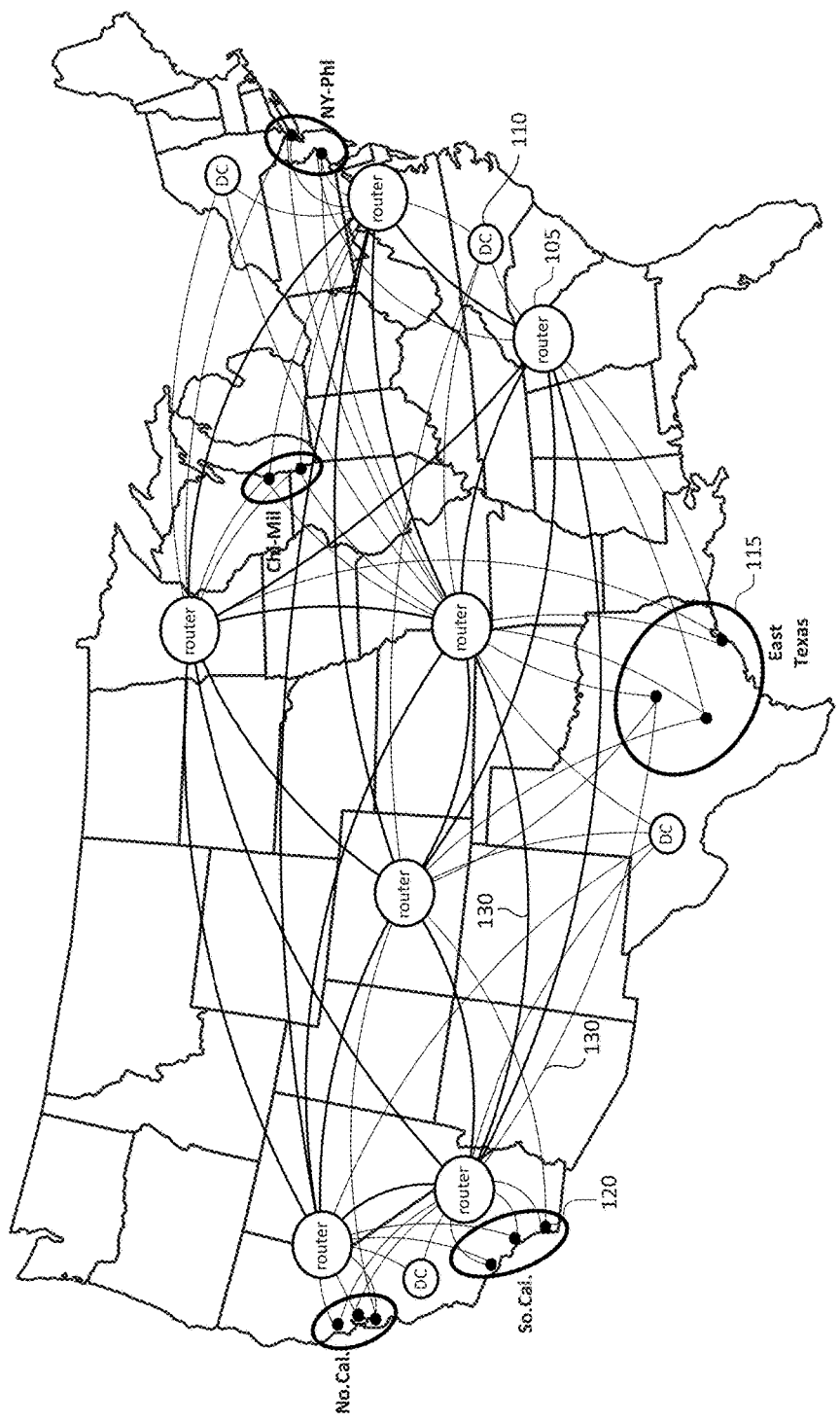
FIG. 1 is a geographic illustration for a networked environment according to an embodiment of the invention.

FIG. 1 is a geographic illustration for a VoIP telephony network environment 100 according to an embodiment of the invention. In this example, there are shown multiple Internet routers 105, multiple telephony service provider data centers 110, arbitrary geographic regions 115 comprised of multiple customer endpoints 120. There are also several illustrative connection routes 130 indicating network connectivity between a customer endpoint 120 and a larger Internet router 105 or among the various Internet routers 105. It should be noted that FIG. 1 is illustrative only. For ease of illustration, not every possible connection route has been shown. In general, for one customer endpoint 120 to communicate with another customer endpoint 120, an IP packet stream must first traverse a communication link from the first customer endpoint 120 to an Internet router 105. At this point, the Internet router 105 may forward the IP packets to another IP router 105 or straight to the destination customer endpoint 120. While FIG. 1 is not completely comprehensive, it is comprehensive enough that one may envision multiple paths between any two customer endpoints 120.

The arbitrary geographic regions 115 are a feature intended to help troubleshoot network issues. For instance, customer endpoints 120 may be grouped by geography because these endpoints may utilize many of the same Internet components (routers, switches, etc.). In such cases, identifying network issues that are geographic specific may help identify a particular network component that is malfunctioning or experiencing traffic issues.

Figure 2:
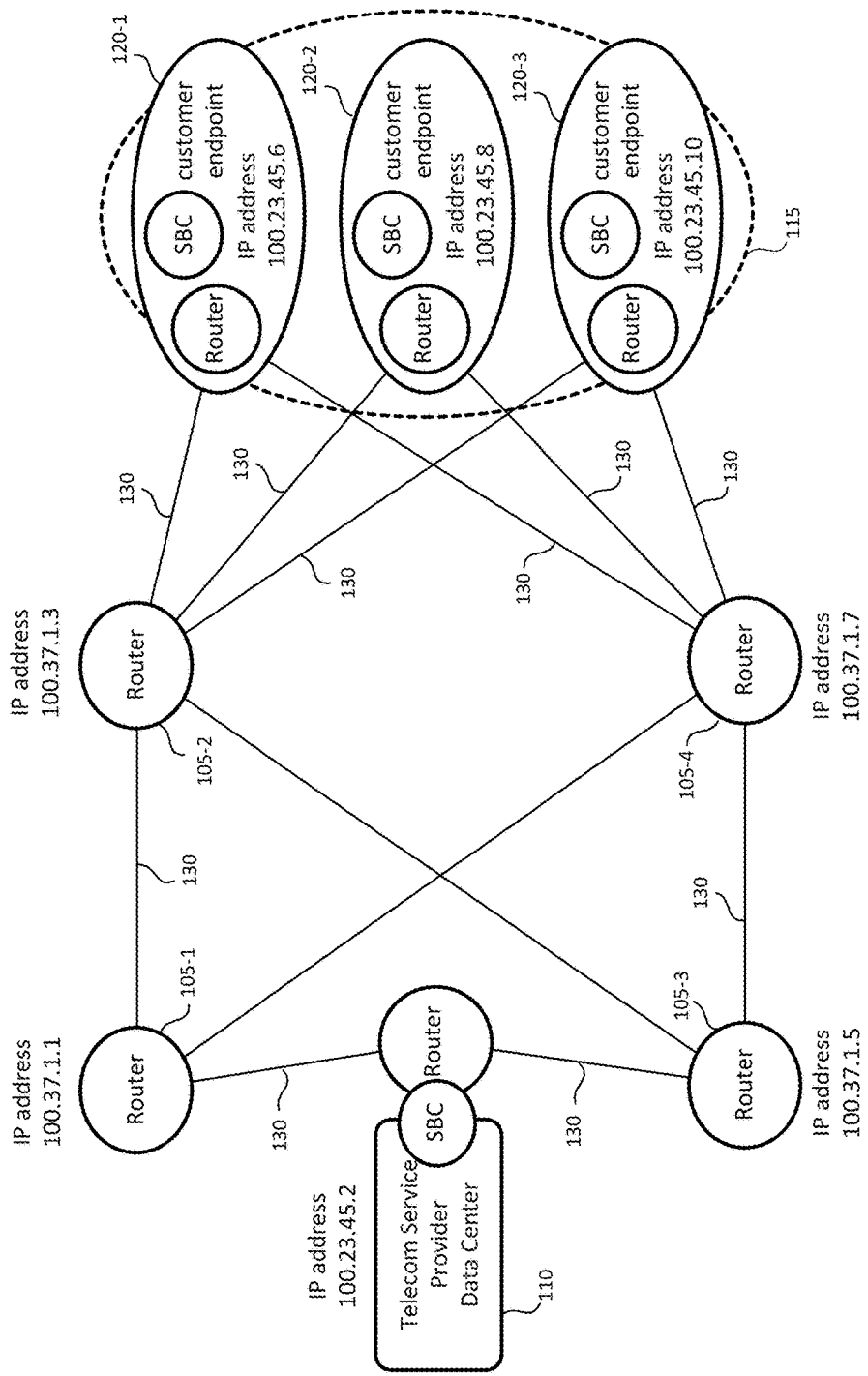
FIG. 2 illustrates a subset of a network diagram according to an embodiment of the invention.

FIG. 2 illustrates a subset of a network diagram according to an embodiment of the invention. Currently, VoIP telephony service providers detect issues pertaining to VoIP telephony networks based on customer complaints. If an interconnection between two networks or network endpoints becomes congested or a network provider (e.g., Internet service provider—ISP) experiences a significant event causing IP traffic traversing their network access point(s) to become degraded, the telephony service provider does not have any tools to narrow the problem without first collecting customer complaints.

FIG. 2 illustrates example connections and/or routes IP traffic may take between a telephony service provider data center 110 and multiple customer endpoints 120-*n*. In between the data center 110 and multiple customer endpoints 120-*n* are a plurality of Internet routers 105-*n*. FIG. 2 also adds a component called a session border controller (SBC) that is co-located with each customer endpoint 120-*n*. For ease of illustration and explanation, each SBC/Customer endpoint 120-*n* combination is associated with a single IP address. An SBC is a device deployed in VoIP networks to exert control over the signaling and usually also the media streams involved in setting up, conducting, and tearing down telephone calls or other interactive media communications.

Each component in the overall IP network has an associated IP address. The IP addresses shown here are arbitrary for ease of description. In this example, data center 110 has an IP address of 100.23.45.2. In addition, the data center 110 may be communicable with two Internet routers 105-1, 105-3 via trace routes 130. In this case, the Internet routers 105-1, 105-3 as well as 105-2, 105-4 may have been assigned an IP address as follows:
Router 105-1 100.37.1.1
Router 105-2 100.37.1.3
Router 105-3 100.37.1.5
Router 105-4 100.37.1.7

Additionally, Internet routers 105-1, 105-2, 105-3 and 105-4 may be communicable with one another over interconnection routes 130. On the other end, customer endpoints 120-1, 120-2, 120-3 may be communicable with Internet routers 105-2 and 105-4 via interconnection routes 130. In this case, each customer endpoint 120-1, 120-2, 120-3 may have been assigned an IP address as follows:
Customer Endpoint 120-2 100.23.45.8
Customer Endpoint 120-3 100.23.45.10

In general, all calls to/from customer endpoints 120-*n* route through a data center 110. There may, however, be many routes between the customer endpoint 120-*n* and a data center 110. As such, the data center 110 may be able to monitor network traffic between itself and the customer endpoints 120-*n* to ensure any network issues are quickly discovered (before being reported by the customer) and possible re-routes are put into place. Data center 110 may do this by periodically testing the connections to each of its customers using an Internet Control Message Protocol (ICMP) echo request commonly known as a "ping" to each of its endpoints 120-1, 120-2, 120-3 by way of any intervening Internet routers 105-1, 105-2, 105-3, 105-4 and/or other network infrastructure components associated with an IP address.

The ping command is a common method for troubleshooting the accessibility of devices. It uses a series of Internet Control Message Protocol (ICMP) echo messages to determine whether a remote host is active or inactive, the round-trip delay in communicating with the host as well as packet loss. The ping command first sends an echo request packet to an IP address, then waits for a reply. The ping is successful only if the echo request gets to the destination IP address, and the destination IP address is able to get an echo reply back to the source IP address within a predetermined time called a timeout. Ping failures may also come with reasons for the failure including destination unreachable, net unreachable, host unreachable, protocol unreachable, port unreachable, fragmentation needed and DF set, and source route failed.

Alternatively, data center 110 may opt to send a SIP OPTIONS message to each of its customer endpoints 120-*n*. A de facto standard that has emerged in the industry to address this problem is the use of the SIP OPTIONS message between two devices. What is important when routing calls is whether the next-hop device is capable and able to accept calls. So, a PBX can send a SIP OPTIONS message periodically to SBCs. Likewise, SBCs can send SIP OPTIONS messages to peer SBC devices. Any response message from the peer indicates the signaling path is good.

This mechanism is known in the industry as an OPTIONS "ping" and is widely supported by equipment manufacturers. It is a very lightweight mechanism that provides a lot of utility and helps to significantly reduce call setup delays due to failure of intermediate network elements or network connections.

If a ping command or a SIP OPTIONS message returns anything less than successful, the data center 110 may use the response to attempt to pinpoint the network component where the failure occurred. In doing so, it can be determined if there is an issue specific to a customer endpoint 120-*n* or an intermediate network component that may be affecting multiple customer endpoints 120-*n*. Early detection may then allow for faster remediation of any network issues as well as offer the chance to re-route IP traffic around affected network components. By "pinging" or sending SIP OPTIONS messages on a periodic basis to all customer endpoints 120-*n*, a data center can keep a current network mapping of trouble spots.

Figure 3:
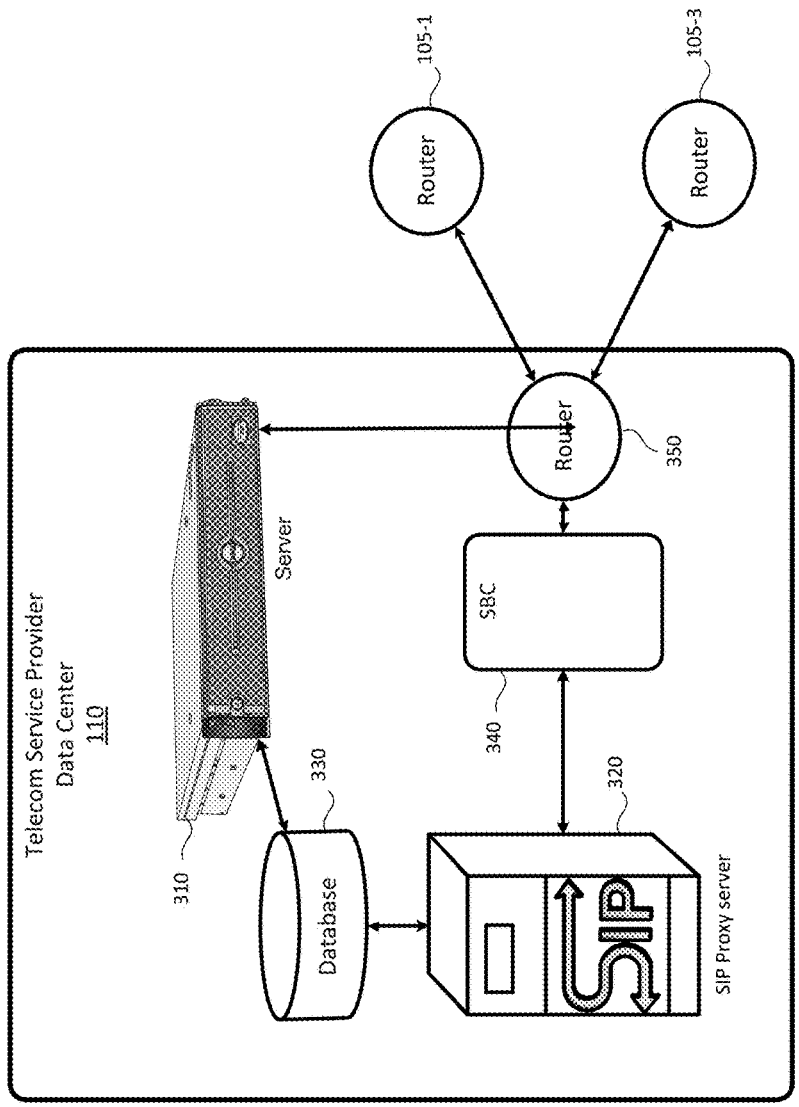
FIG. 3 illustrates an example of a data center according to an embodiment of the invention.

FIG. 3 illustrates an example of a data center 110 according to an embodiment of the invention. A server 310 comprised of one or more processors operates on computer instructions to carry out various functions and tasks relating to the embodiments described herein. The server 310 may be coupled with a database 330, the database 330 including records relating to call routing information to used by SIP Proxy server 320 and SBC 340 in the processing of calls. The server 310 and database 330 may be further coupled with a SIP proxy server 320. The SIP proxy server 320 may be responsible for call routing. The SIP proxy server 320 may, in turn, be coupled with a session border controller (SBC) 340 that provides session admission control and media handling.

The purpose of the data center 110 is to provide connectivity, power and environmental conditioning for the provisioning server 310, SIP proxy server 320, database 330, SBC 340 and router 350.

FIG. 4 illustrates an example logic flow diagram 400 according to an embodiment of the invention. Logic flow 400 may be representative of some or all of the operations executed by one or more logic, features, or devices described herein, such as any devices, systems, methods and/or techniques described above with references to FIGS. 1-3 for example. More particularly, logic flow 400 may be implemented by the network based server 310 and/or SIP server 320 associated with the data center 110 depicted in FIG. 3 in some embodiments. Other embodiments may be described and claimed.

The process may begin at block 405 when the server 310 associated with a data center 110 may generate a list of customer endpoints 120-$n$ to be monitored. This may be done by generating a list of IP addresses associated with each customer. At block 410, one IP address routing path may be assigned for each outbound customer endpoint 120-$n$ traffic bearing circuit for the customer endpoints 120-$n$ served by that data center 110. The data center 110 determines a routing path by selecting the first hop that data intended for a customer endpoint IP address will traverse. For instance, the data center 110 may specify that traffic for a customer endpoint exit router 350 toward router 105-1. This selection may be performed for each customer endpoint 120-$n$ traffic bearing circuit.

At block 415, server 310 determines if the IP addresses associated with customer endpoints 120-$n$ have responded to ICMP pings or SIP OPTIONS messages. If there is no response to the ICMP pings or SIP OPTIONS messages, the non-responding customer endpoint IP addresses are discarded at block 420. A customer endpoint IP address may be non-responsive for a variety of reasons. Customer firewall configuration is one example. At block 425, server 310 causes ICMP pings or SIP OPTIONS messages to be sent to all customer endpoint IP addresses generated in block 405 that were not discarded in block 420.

This may be followed by recording the response times to the ICMP pings or SIP OPTIONS messages at block 430. A decision may then be made whether the recorded response times for the customer endpoint IP addresses are within expectations or are anomalous at block 435. If recorded response times for one or more customer endpoint IP addresses are not anomalous, control is returned to block 425 where the next cycle of ICMP pings or SIP OPTIONS messages may be sent to those customer endpoint IP addresses. If recorded response times for one or more customer endpoint IP addresses are anomalous, server 310 may geo-locate cluster the anomalous responding customer endpoint IP addresses into arbitrary geographic areas 115 at block 440.

At block 445, it may be determined whether there are multiple different customers with endpoint IP addresses impacted that are part of the same geographic area 115. If impacted customer endpoint IP addresses are not grouped with other impacted customer endpoint IP addresses by geographic area 115, it may be determined at block 450 that the network issue lies within the network equipment of that particular customer endpoint 120-$n$. In other words, if the IP addresses of that customer endpoint 120-$n$ are the only impacted customer endpoint IP addresses within a geographic area 115, it strongly implies the problem is contained within the customer endpoint 120-$n$ and not a network component that also services other customer endpoints 120-$n$. The impacted customer endpoint 120-$n$ may then be notified that they have a potential network problem on their end.

If impacted customer endpoint IP addresses are grouped with other impacted customer endpoint IP addresses (i.e., IP addresses of a different customer endpoint 120-$n$) by geographic area 115, it suggests there may be a broader network problem that needs to be pinpointed so that it may be addressed. For instance, at block 455, data center 110 may perform traceroutes to all customer endpoint IP addresses for all affected customer endpoints 120-$n$ situated in the impacted geographic area 115 from the assigned IP addresses set in block 410

When executing a traceroute command the data center server 310 may send out a few packets with a TTL (Time-to-Live) of 1. When those packets reach the next hop (e.g., router), it will decrease the TTL to 0 and thus reject the packet. The router will send an ICMP Time-to-Live Exceeded (Type 11), TTL equal 0 during transit (Code 0) response back to the data center server 310 with a source address of the router itself. The data center server 310 now knows the address of the first router (i.e., hop) in the path to a destination customer endpoint IP address. Next, server 310 may send packets with a TTL of 2. The first router, already known to the data center server 310, passes the packets on to the next router (hop) after reducing the TTL from 2 to 1. The next router decreases the TTL to 0, rejects the packet and sends the same ICMP Time-to-Live Exceeded with its address as the source back to server 310. Server 310 now knows the first two (2) routers in the path to a destination customer endpoint IP address. This process may be repeated until the packets actually reach the destination. Because server 310 is sending packets with a particular customer endpoint IP address as the destination address, once it gets to the destination the packet is wanting to connect to the port that server 310 has sent as the destination port. Because it is an uncommon port, it will most likely be rejected with an ICMP Destination Unreachable (Type 3), Port Unreachable (Code 3) response. This ICMP message is sent back to server 310, which will understand this as being the last hop. If this process is successful, the traceroute will exit and the server 310 will know all the hops between itself and the destination customer endpoint IP address.

If it is unsuccessful, the server 310 should know which hop may be causing problems by comparing the traceroute data from all the traceroutes performed between server 310 and the multiple customer endpoint IP addresses. For instance, the server 310 within data center 110 may then geocode all of the hops among all customer endpoint IP addresses for each customer endpoint 120-$n$ in the impacted geographic region 115 at block 460. The results of block 460 may then be processed to determine common points among impacted and non-impacted customer endpoints 120-$n$ at block 465. This data may then be further processed to determine whether there are alternate non-impacted paths from data center 110 to affected customer endpoint IP addresses at block 470. If there are non-impacted paths between a data center 110 and a customer endpoint **120-*n*, traffic may be re-routed to use the non-impacted path at block 475 by changing the routing behavior of router 350**.

Figure 5A:
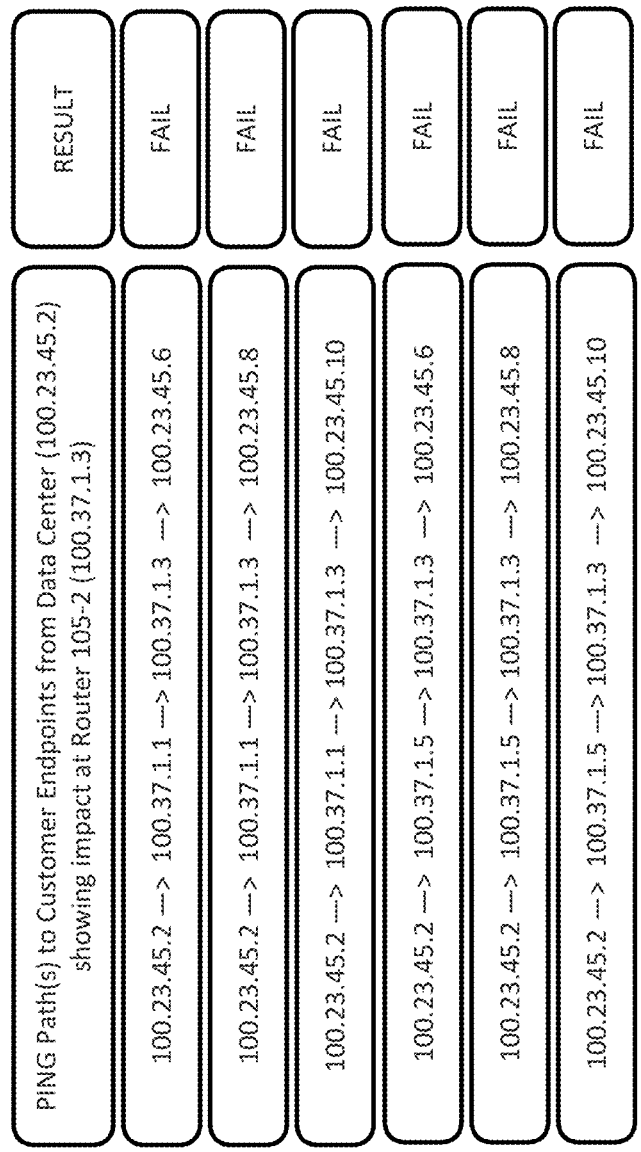
FIG. 5A illustrates example paths between a service provider data center and various customers according to an embodiment of the invention.

FIG. 5A illustrates example paths between a service provider data center and various customers according to an embodiment of the invention. Pursuant to this example, a data center 310 has run traceroutes to multiple customer endpoint IP addresses of multiple customer endpoints **120-*n* to determine which hop is failing. The left column illustrates a destination IP address for a customer endpoint 120-*n*. Specifically, there are three IP addresses targeted, each associated with a different customer endpoint. They are IP address 100.23.45.6 associated with customer endpoint 120-1, IP address 100.23.45.8 associated with customer endpoint 120-2, and IP address 100.23.45.10 associated with customer endpoint 120-3. In each case, the column on the right has indicated that the result of the ping test is a failure. Moreover, the failure point each time occurs at IP address 100.37.1.3 associated with router 105-2. Using the information obtained from the traceroutes, the data center server 310 may test alternate routes to get around the router/hop 105-2** that appears to be malfunctioning.

Figure 5B:
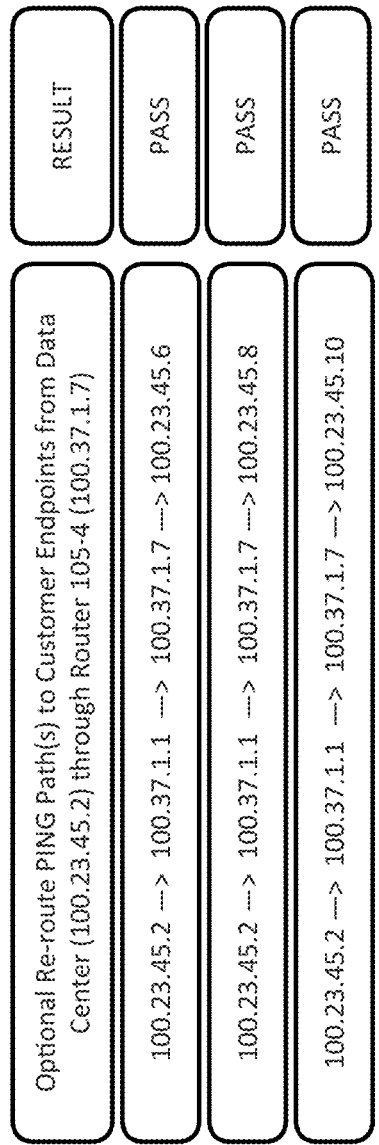
FIG. 5B illustrates another example paths between a service provider data center and various customers according to an embodiment of the invention.

The results of the alternate traceroute tests are illustrated in FIG. 5B. In these traceroutes, router 105-4 having IP address 100.37.1.7 was used instead of router 105-2. The result column indicates that the traceroutes exited after successfully reaching their destination IP addresses for each customer endpoint **120-*n*. For example, customer endpoint 120-1 with IP address 100.23.45.6 was successfully reached as was customer endpoint 120-2 with IP address 100.23.45.8 and customer endpoint 120-3 with IP address 100.23.45.10. Because all three different customer endpoints were successfully reached, there is a confidence that the problem did indeed reside in router 105-2 and not with the equipment of the customer endpoint 120-*n*. If, for instance, only customer endpoint 120-2 had failed while 120-1 and 120-3 were successful, it could be argued that the equipment associated with customer endpoint 120-2** may be malfunctioning.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method comprising:
   in a network based server situated in an Internet Protocol (IP) based packet data network:
   sending a notification message to a plurality of IP addresses each associated with a customer endpoint;
   receiving a notification response from each of the customer endpoint IP addresses;
   determining a notification response time for each of the customer endpoint IP addresses;
   comparing the notification response time for each of the customer endpoint IP addresses to an expected notification response time;
   geo-locating the customer endpoint IP addresses that exceeded an expected notification response time;
   performing traceroutes to customer endpoint IP addresses in the same geo-located area that exceeded the expected notification response time period;
   geo-coding all hops between the server and the customer endpoint IP addresses for each traceroute performed to determine impacted and non-impacted routes between the server and each customer endpoint IP address; and
   re-routing IP traffic between the server and a customer endpoint IP address from an impacted route to a non-impacted route.

2. The method of claim 1 wherein the notification message is an Internet Control Message Protocol (ICMP) echo message.

3. The method of claim 1 wherein the notification message is a session initiation protocol (SIP) OPTIONS message.

4. A network based server situated in an Internet Protocol (IP) based packet data network, comprising:
   a memory unit for storing code;
   at least one processor for executing the stored code to:
   send a notification message to a plurality of IP addresses each associated with a customer endpoint;
   receive a notification response from each of the customer endpoint IP addresses;
   determine a notification response time for each of the customer endpoint IP addresses;
   compare the notification response time for each of the customer endpoint IP addresses to an expected notification response time;
   geo-locate the customer endpoint IP addresses that exceeded an expected notification response time;
   perform traceroutes to customer endpoint IP addresses in the same geo-located area that exceeded the expected notification response time period;
   geo-code all hops between the server and the customer endpoint IP addresses for each traceroute performed to determine impacted and non-impacted routes between the server and each customer endpoint IP address; and re-route IP traffic between the server and a customer endpoint IP address from an impacted route to a non-impacted route.

5. The at least one non-transitory machine-readable medium of claim 4, wherein the notification message is an Internet Control Message Protocol (ICMP) echo message.

6. The at least one non-transitory machine-readable medium of claim 4, wherein the notification message is a session initiation protocol (SIP) OPTIONS message.

7. An apparatus, comprising:
   memory;
   logic, at least a portion of which is implemented in circuitry coupled to the memory, the logic to:
   send a notification message to a plurality of IP addresses each associated with a customer endpoint;
   receive a notification response from each of the customer endpoint IP addresses;
   determine a notification response time for each of the customer endpoint IP addresses;
   compare the notification response time for each of the customer endpoint IP addresses to an expected notification response time;
   geo-locate the customer endpoint IP addresses that exceeded an expected notification response time;
   perform traceroutes to customer endpoint IP addresses in the same geo-located area that exceeded the expected notification response time period;
   geo-code all hops between the server and the customer endpoint IP addresses for each traceroute performed to determine impacted and non-impacted routes between the server and each customer endpoint IP address; and
   re-route IP traffic between the server and a customer endpoint IP address from an impacted route to a non-impacted route.

8. The apparatus of claim 7, wherein the notification message is an Internet Control Message Protocol (ICMP) echo message.

9. The apparatus of claim 7, wherein the notification message is a session initiation protocol (SIP) OPTIONS message.

* * * * *